(12) United States Patent
Goto et al.

(10) Patent No.: US 9,012,098 B2
(45) Date of Patent: Apr. 21, 2015

(54) HYDROGEN PRODUCTION APPARATUS AND FUEL CELL SYSTEM

(75) Inventors: Akira Goto, Tokyo (JP); Toshiyuki Unno, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 135 days.

(21) Appl. No.: 13/637,880

(22) PCT Filed: Mar. 18, 2011

(86) PCT No.: PCT/JP2011/056603
§ 371 (c)(1),
(2), (4) Date: Nov. 29, 2012

(87) PCT Pub. No.: WO2011/122372
PCT Pub. Date: Oct. 6, 2011

(65) Prior Publication Data
US 2013/0065145 A1  Mar. 14, 2013

(30) Foreign Application Priority Data
Mar. 30, 2010 (JP) ............................... P2010-078818

(51) Int. Cl.
*H01M 8/06* (2006.01)
*C01B 3/38* (2006.01)
(Continued)

(52) U.S. Cl.
CPC ......... *C01B 3/384* (2013.01); *C01B 2203/0233* (2013.01); *C01B 2203/0283* (2013.01);
(Continued)

(58) Field of Classification Search
CPC .... C01B 3/384; C01B 3/48; C01B 2203/127; C01B 2203/0283; C01B 2203/044; C01B 2203/047; C01B 2203/066; C01B 2203/0811; C01B 2203/0822; C01B 2203/0827; C01B 2203/085; C01B 2203/1604; C01B 2203/0288; C01B 2203/0233; C01B 2203/10; H01M 8/0631; H01M 8/0668; H01J 8/0469; B01J 8/0469; B01J 8/0496; B01J 8/0465; B01J 2208/00212; B01J 2208/00504; Y02E 60/50
USPC ........................................................ 429/425
See application file for complete search history.

(56) References Cited

U.S. PATENT DOCUMENTS

| | | | |
|---|---|---|---|
| 6,413,479 | B1 | 7/2002 | Kudo et al. |
| RE39,675 | E | 6/2007 | Kudo et al. |

(Continued)

FOREIGN PATENT DOCUMENTS

| | | |
|---|---|---|
| CN | 101208263 | 6/2008 |
| CN | 101421181 | 4/2009 |

(Continued)

OTHER PUBLICATIONS

International Search Report issued with respect to PCT/JP2011/056603, mailed May 10, 2011.
(Continued)

*Primary Examiner* — Gary Harris
(74) *Attorney, Agent, or Firm* — Greenblum & Bernstein, P.L.C.

(57) ABSTRACT

A hydrogen production apparatus includes a burner, a combustion tube provided so as to surround flame of the burner, a reforming unit provided so as to surround the tube, an exhaust gas flow path provided so as to pass through between the tube and the unit, fold back at the other side of the unit, and extend through outside of the unit on a predetermined side, a low temperature shift unit provided on one of inside and outside of an extending portion of the flow path that extends on the predetermined side so as to extend along the extending portion, and a preferential oxidation unit provided on the other of the inside and the outside of the extending portion so as to extend along the extending portion.

5 Claims, 4 Drawing Sheets

(51) Int. Cl.
  *B01J 8/04* (2006.01)
  *C01B 3/48* (2006.01)
(52) U.S. Cl.
  CPC ..... *C01B2203/044* (2013.01); *C01B 2203/047* (2013.01); *C01B 2203/066* (2013.01); *C01B 2203/0811* (2013.01); *C01B 2203/0822* (2013.01); *C01B 2203/0827* (2013.01); *C01B 2203/085* (2013.01); *C01B 2203/1604* (2013.01); *H01M 8/0631* (2013.01); *H01M 8/0668* (2013.01); *Y02E 60/50* (2013.01); *B01J 8/0469* (2013.01); *B01J 8/0496* (2013.01); *B01J 8/0465* (2013.01); *C01B 3/48* (2013.01); *B01J 2208/00212* (2013.01); *B01J 2208/00283* (2013.01); *B01J 2208/00504* (2013.01); *C01B 2203/0288* (2013.01); *C01B 2203/127* (2013.01)

(56) References Cited

U.S. PATENT DOCUMENTS

| | | | |
|---|---|---|---|
| 8,097,371 | B2 | 1/2012 | Suehiro et al. |
| 8,216,323 | B2 | 7/2012 | Liu et al. |
| 8,257,668 | B2 | 9/2012 | Mukai et al. |
| 2001/0009653 | A1* | 7/2001 | Clawson et al. ........... 423/437.1 |
| 2004/0043262 | A1 | 3/2004 | Asou et al. |
| 2006/0117660 | A1 | 6/2006 | Woo et al. |
| 2006/0207179 | A1* | 9/2006 | Mizusawa et al. .......... 48/197 R |
| 2007/0000176 | A1 | 1/2007 | Liu et al. |
| 2009/0280363 | A1 | 11/2009 | Suehiro et al. |
| 2010/0015480 | A1 | 1/2010 | Mukai et al. |
| 2010/0040518 | A1 | 2/2010 | Woo et al. |
| 2011/0091359 | A1* | 4/2011 | Woo et al. ..................... 422/163 |
| 2011/0113688 | A1 | 5/2011 | Kuwaba et al. |

FOREIGN PATENT DOCUMENTS

| | | |
|---|---|---|
| CN | 101500940 | 8/2009 |
| EP | 0 922 666 | 6/1997 |
| EP | 1 669 133 | 6/2006 |
| JP | 2003-252604 | 9/2003 |
| JP | 2006-076850 | 3/2006 |
| JP | 2006-248864 | 9/2006 |
| JP | 2007-335224 | 12/2007 |
| JP | 2008-120604 | 5/2008 |
| JP | 2009-078954 | 4/2009 |
| JP | 2009-274886 | 11/2009 |
| WO | 2009/115890 | 9/2009 |
| WO | 2009/139159 | 11/2009 |

OTHER PUBLICATIONS

English-language translation of International Preliminary Report on Patentability issued with respect to PCT/2011/056603, mailed Nov. 1, 2012.

Office Action for CN Patent Application No. 201180016522.5, mailed on Feb. 26, 2014.

Extended European Search Report for counterpart EP Application No. 11762605.1, which was mailed on Mar. 7, 2014.

* cited by examiner

HYDROGEN PRODUCTION APPARATUS AND FUEL CELL SYSTEM

TECHNICAL FIELD

The present invention relates to a hydrogen production apparatus for generating a reformed gas containing hydrogen using a raw fuel and steam, and to a fuel cell system including such a hydrogen production apparatus.

BACKGROUND ART

In some of hydrogen production apparatuses as described in Technical Field above, a low temperature shift unit and a preferential oxidation unit for reducing a carbon monoxide concentration in a reformed gas are provided at a stage following a reforming unit for subjecting a raw fuel and steam to a reforming reaction to generate a reformed gas. The reforming unit is heated with a burner in many cases because a reforming reaction is an endothermic reaction at high temperatures. Therefore, a high-temperature reformed gas is exhausted from an outlet of the reforming unit, and an exhaust gas from the burner passes in the vicinity of the outlet of the reforming unit. The high-temperature reformed gas exhausted from the outlet of the reforming unit is introduced to the low temperature shift unit and the preferential oxidation unit after being cooled by a heat exchange unit or the like in many cases because a shift reaction and a preferential oxidation reaction are performed at temperatures lower than the reforming reaction due to catalyst reaction conditions. Furthermore, the exhaust gas from the burner is cooled with raw water or the like in the heat exchange unit, without coming into direct contact with the low temperature shift unit and the preferential oxidation unit, and exhausted to the outside of the hydrogen production apparatus in many cases. Therefore, the low temperature shift unit and the preferential oxidation unit are sometimes provided with an electrical heater for increasing the temperature during start-up, for the purpose of quickly increasing the temperature of the low temperature shift unit and the preferential oxidation unit and reducing the start-up time when each inside catalyst is heated to a usable temperature during start-up of the hydrogen production apparatus (see, for example, Patent Literatures 1 and 2).

CITATION LIST

Patent Literatures

[Patent Literature 1] Japanese Patent Application Laid-Open Publication No. 2006-248864
[Patent Literature 2] Japanese Patent Application Laid-Open Publication No. 2007-335224

SUMMARY OF INVENTION

Technical Problem

However, when an electrical heater is used to quickly increase the temperature of the low temperature shift unit and the preferential oxidation unit during start-up of the hydrogen production apparatus, it is likely that a great deal of start-up energy is consumed.

The present invention therefore aims to provide a hydrogen production apparatus capable of quickly increasing the temperature of the low temperature shift unit and the preferential oxidation unit while suppressing consumption of start-up energy, and a fuel cell system including such a hydrogen production apparatus.

Solution to Problem

In order to achieve the aforementioned object, a hydrogen production apparatus for generating a reformed gas containing hydrogen using a raw fuel and steam includes a burner, a combustion tube provided so as to surround flame of the burner and exhausting an exhaust gas of the burner from one side thereof, a reforming unit provided in a tubular shape so as to surround the combustion tube and subjecting the raw fuel and the steam to a reforming reaction to generate the reformed gas, an exhaust gas flow path provided in a tubular shape so as to pass through between the combustion tube and the reforming unit, fold back at the other side of the reforming unit, and extend through outside of the reforming unit on a predetermined side, passing the exhaust gas exhausted from the one side of the combustion tube, a low temperature shift unit provided in a tubular shape on one of inside and outside of an extending portion of the exhaust gas flow path that extends on the predetermined side so as to extend along the extending portion, subjecting the reformed gas generated in the reforming unit to a shift reaction to reduce a carbon monoxide concentration in the reformed gas, and a preferential oxidation unit provided in a tubular shape on the other of the inside and the outside of the extending portion so as to extend along the extending portion, preferentially oxidizing the reformed gas subjected to the shift reaction in the low temperature shift unit to further reduce the carbon monoxide concentration.

In the hydrogen production apparatus, the low temperature shift unit is provided in a tubular shape on one of the inside and the outside of the extending portion of the exhaust gas flow path so as to extend along the extending portion, and the preferential oxidation unit is provided in a tubular shape on the other of the inside and the outside of the extending portion of the exhaust gas flow path so as to extend along the extending portion. Therefore, during start-up of the hydrogen production apparatus, when the exhaust gas from the burner is passed through the exhaust gas flow path, the heat of the exhaust gas heats the low temperature shift unit and the preferential oxidation unit to increase the temperature thereof. In this manner, in the hydrogen production apparatus, the use of an electrical heater in the low temperature shift unit and the preferential oxidation unit becomes unnecessary during start-up and the temperature of the low temperature shift unit and the preferential oxidation unit can be quickly increased while suppressing consumption of start-up energy.

The hydrogen production apparatus as described above may further include a vaporization unit heating water stored therein with ambient heat to generate the steam. The vaporization unit may be provided in a tubular shape so as to extend along the extending portion at at least one of the following positions: between the extending portion and the low temperature shift unit; between the extending portion and the preferential oxidation unit; inside of the extending portion, the low temperature shift unit, and the preferential oxidation unit; and outside of the extending portion, the low temperature shift unit, and the preferential oxidation unit. In such a configuration, when water is introduced to the vaporization unit, and a raw fuel and steam are further introduced to the reforming unit to allow the reforming unit to generate the reformed gas, not only the heat of the exhaust gas but also the heat of the reaction in the low temperature shift unit and the heat of the reaction in the preferential oxidation unit move to the vaporization unit. Therefore, the low temperature shift unit and the preferential oxidation unit can be kept at the respective proper reaction temperatures.

A fuel cell system includes the hydrogen production apparatus as described above and a fuel cell stack generating power using the reformed gas generated by the hydrogen production apparatus.

The fuel cell system includes the hydrogen production apparatus as described above and therefore can quickly increase the temperature of the low temperature shift unit and the preferential oxidation unit while suppressing consumption of start-up energy.

Advantageous Effects of Invention

According to the present invention, the temperature of the low temperature shift unit and the preferential oxidation unit can be quickly increased while suppressing consumption of start-up energy.

DESCRIPTION OF EMBODIMENTS

Preferred embodiments of the present invention will be described in detail below with reference to the figures. It is noted that in the figures the same or corresponding parts are denoted with the same reference signs, and an overlapping description will be omitted.

Figure 1:
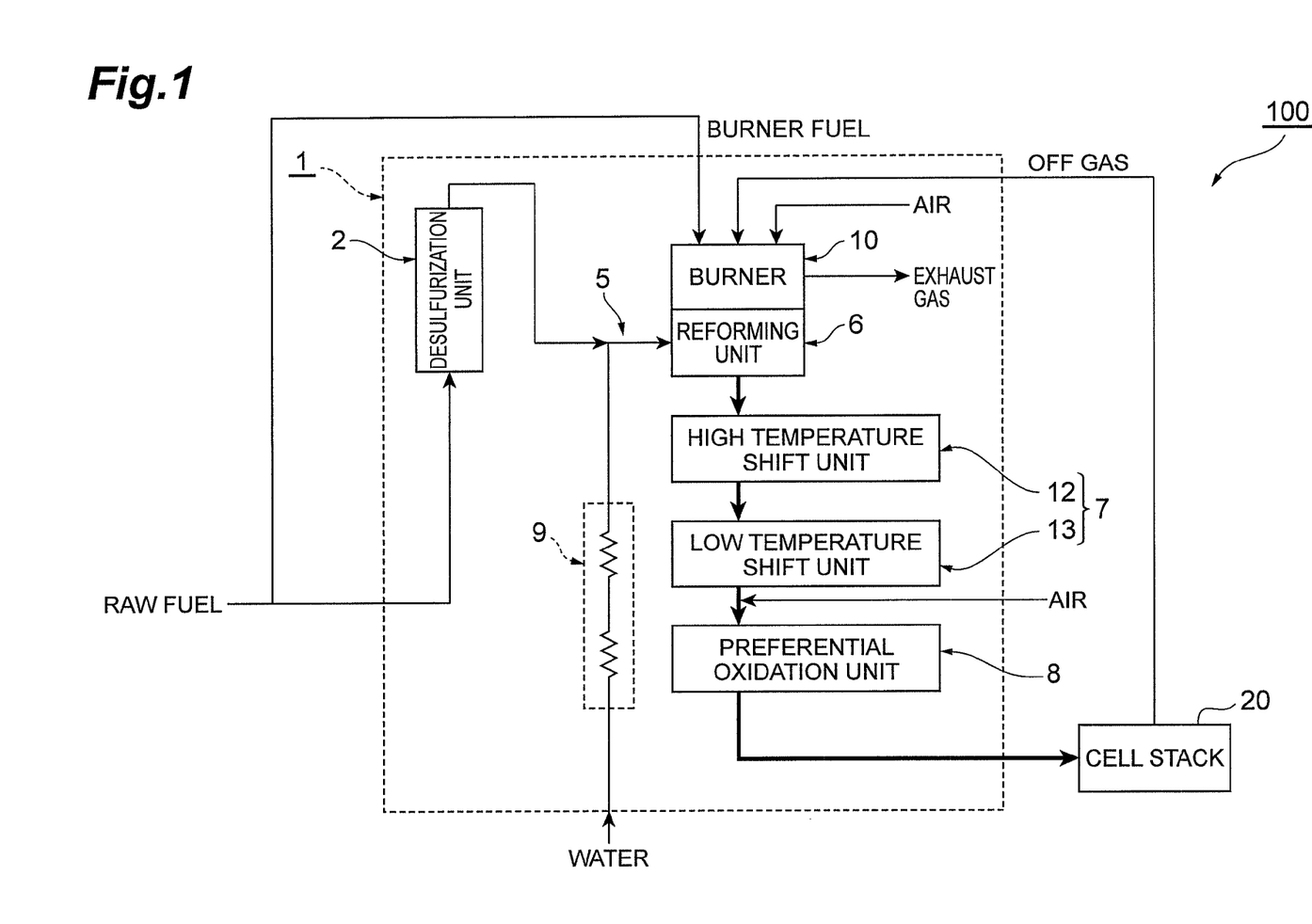
FIG. 1 is a block diagram of a fuel cell system according to an embodiment of the present invention.

As illustrated in FIG. 1, a hydrogen production apparatus (fuel processing system (FPS)) 1 is used, for example, as a hydrogen supply source in a fuel cell system 100 for home use. The hydrogen production apparatus 1 here uses petroleum-derived hydrocarbon as a raw fuel and supplies a reformed gas containing hydrogen to a cell stack (fuel cell stack) 20. The cell stack 20 generates power using the reformed gas generated by the hydrogen production apparatus 1.

Examples of the raw fuel used include alcohols, ethers, biofuel, natural gas, and city gas. Examples of the petroleum-derived hydrocarbon used as a raw fuel include kerosene, LP gas, naphtha, and light oil. A variety of cells including a polymer electrolyte fuel cell or the like can be used for the cell stack 20.

Figure 2:
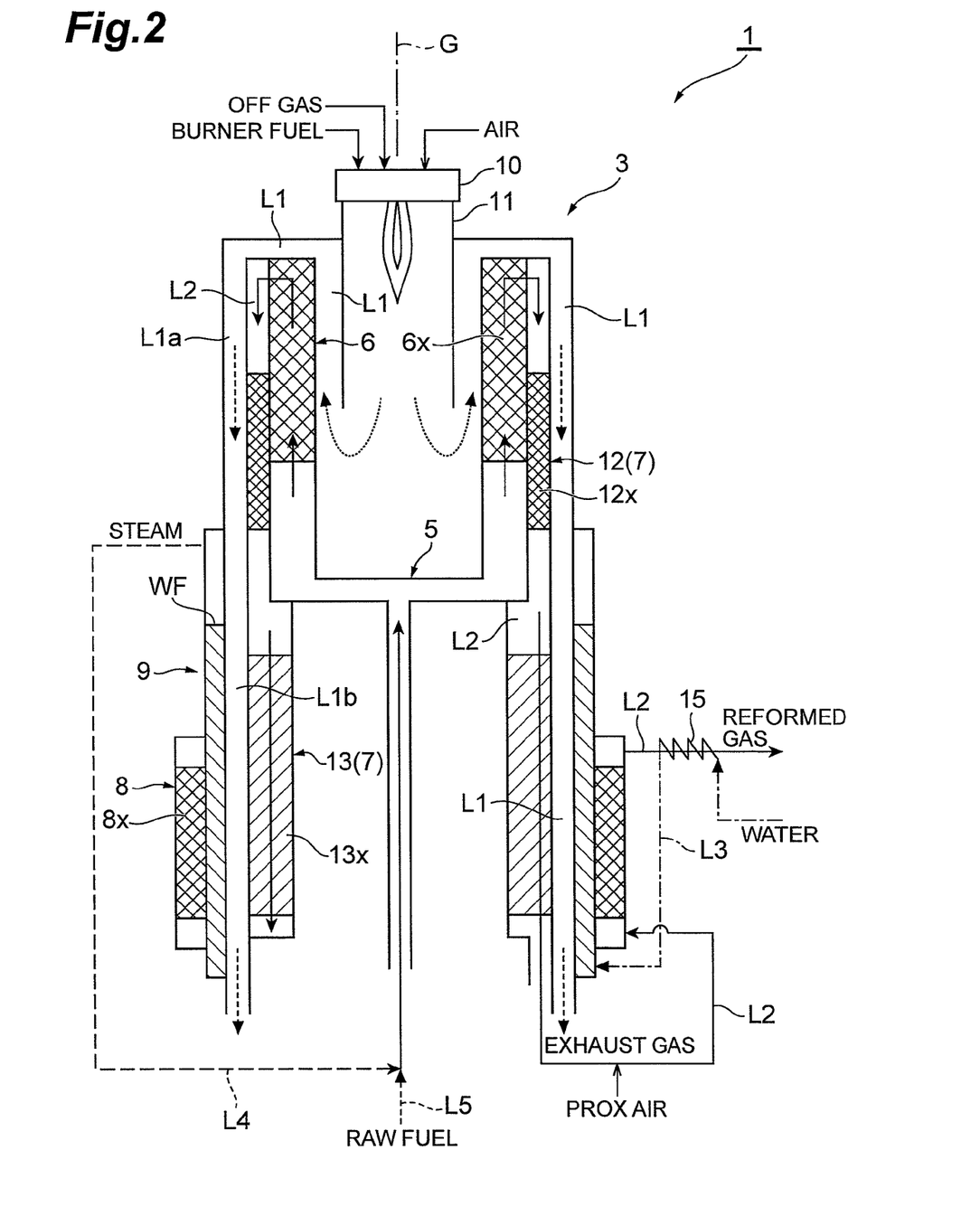
FIG. 2 is an end view of a hydrogen production apparatus in FIG. 1.

As illustrated in FIGS. 1 and 2, the hydrogen production apparatus 1 includes a desulfurization unit 2 and a main unit 3 having a cylindrical outer shape with the axis G as the center axis. The desulfurization unit 2 desulfurizes a raw fuel externally introduced with a desulfurization catalyst to remove sulfur components and supplies the raw fuel thus desulfurized to a feed unit 5 described later. The main unit 3 includes the feed unit 5, a reforming unit 6, a shift unit 7, a preferential oxidation unit 8, and a vaporization unit 9, which are integrally assembled.

The feed unit 5 combines and mixes the raw fuel desulfurized by the desulfurization unit 2 with steam to generate a mixture gas (mixture fluid), diffuses the mixture gas thus generated, and supplies the mixture gas to the reforming unit 6. The reforming (SR: Steam Reforming) unit 6 generates a reformed gas by steam-reforming the mixture gas supplied from the feed unit 5 with a reforming catalyst (reforming catalyst unit) 6$x$ and supplies the reformed gas to the shift unit 7.

The reforming unit 6 has a cylindrical outer shape with the axis G as the center axis and is provided at the upper end side of the main unit 3. In the reforming unit 6, a burner 10 is used as a heat source for heating the reforming catalyst 6$x$ of the reforming unit 6 because the steam reforming reaction is an endothermic reaction.

In the burner 10, a raw fuel is externally supplied as a burner fuel and burnt. The burner 10 is mounted such that flame by the burner 10 is surrounded with a combustion tube 11 provided at an upper end portion of the main unit 3 with the axis G as the center axis. The exhaust gas from the burner 10 passes through an exhaust gas flow path L1 and is exhausted to the outside. In the burner 10, part of the raw fuel desulfurized by the desulfurization unit 2 may be supplied as a burner fuel and burnt.

The shift unit 7 is to reduce a carbon monoxide concentration (CO concentration) in the reformed gas supplied from the reforming unit 6, and converts carbon monoxide into hydrogen and carbon dioxide through a shift reaction of carbon monoxide in the reformed gas, which is an exothermic reaction. The shift unit 7 here performs the shift reaction in two separate stages and has a high temperature shift (HTS) unit 12 that performs a high temperature shift reaction that is a shift reaction at high temperatures (for example, from 400° C. to 600° C.), and a low temperature shift (LTS) unit 13 that performs a low temperature shift reaction that is a shift reaction at low temperatures (for example, from 150° C. to 350° C.) lower than the temperatures in the high temperature shift reaction.

The high temperature shift unit 12 subjects carbon monoxide in the reformed gas supplied from the reforming unit 6 to a high temperature shift reaction with a high temperature shift catalyst 12$x$ to reduce the CO concentration in the reformed gas. The high temperature shift unit 12 has a cylindrical outer shape with the axis G as the center axis and is arranged adjacent to and radially outside the reforming unit 6 such that the high temperature shift catalyst 12$x$ surrounds a lower end portion of the reforming catalyst 6$x$. The high temperature shift unit 12 supplies the reformed gas with a reduced CO concentration to the low temperature shift unit 13.

The low temperature shift unit 13 subjects carbon monoxide in the reformed gas subjected to a high temperature shift reaction in the high temperature shift unit 12, to a low temperature shift reaction with a low temperature shift catalyst 13$x$ to reduce the CO concentration in the reformed gas. The low temperature shift unit 13 has a cylindrical outer shape with the axis G as the center axis and is disposed on the lower end side of the main unit 3. The low temperature shift unit 13 supplies the reformed gas with a reduced CO concentration to the preferential oxidation unit 8.

The preferential oxidation (PROX) unit 8 further reduces the CO concentration in the reformed gas subjected to a low temperature shift reaction in the low temperature shift unit 13. This is because if high-concentration carbon monoxide is supplied to the cell stack 20, the catalyst in the cell stack 20 is poisoned and significantly degraded in performance. Specifically, the preferential oxidation unit 8 promotes a preferential oxidation reaction, which is exothermic reaction, between carbon monoxide in the reformed gas and the air externally introduced with a preferential oxidation catalyst 8x thereby to preferentially oxidize the carbon monoxide and convert it into carbon dioxide.

The preferential oxidation unit 8 has a cylindrical outer shape with the axis G as the center axis and is disposed so as to form the outermost circumferential side of the main unit 3 from the lower end toward the upper end of the main unit 3 by a predetermined length. The preferential oxidation unit 8 discharges the reformed gas with a further reduced CO concentration to the outside.

The vaporization unit 9 generates steam by vaporizing water stored therein with ambient heat, that is, heat moved from the low temperature shift unit 13, the preferential oxidation unit 8, and the exhaust gas flow path L1 (obtained by cooling the low temperature shift unit 13, the preferential oxidation unit 8, and exhaust gas). The vaporization unit 9 is a jacket type and has a cylindrical shape with the axis G as the center axis. The vaporization unit 9 supplies the generated steam to the feed unit 5.

In this hydrogen production apparatus 1, first, at least one of the burner fuel and off gas from the cell stack 20 (residual gas not used for the reaction in the cell stack 20) and the air are supplied to the burner 10 and burnt. This combustion heats the reforming catalyst 6x. Then, the exhaust gas (waste gas) from the burner 10 passes through the exhaust gas flow path L1 and exhausted to the outside.

Meanwhile, the raw fuel desulfurized in the desulfurization unit 2 and the steam from the vaporization unit 9 are mixed in the feed unit 5 to generate a mixture gas. The mixture gas is supplied to the reforming unit 6 and steam-reformed with the reforming catalyst 6x. A reformed gas is thus generated. Then, the shift unit 7 reduces the carbon monoxide concentration of the generated reformed gas to, for example, 1% or lower. After that, the reformed gas is mixed with the air externally introduced and then the preferential oxidation unit 8 reduces the carbon monoxide concentration of the resulting gas to about 10 ppm or lower, and the generated reformed gas is introduced to the cell stack 20 on the following stage.

In the present embodiment, in order to suitably perform a catalytic reaction with each catalyst 6x, 12x, 13x, and 8x, for example, the temperature of each section is set as follows. Specifically, the temperature of the mixture gas flowing into the reforming unit 6 is set from about 300° C. to 550° C. The temperature of the reformed gas flowing out of the reforming unit 6 is set from 550° C. to 800° C. The temperature of the reformed gas flowing into the high temperature shift unit 12 is set from 400° C. to 600° C. The temperature of the reformed gas flowing out of the high temperature shift unit 12 is set from 300° C. to 500° C. The temperature of the reformed gas flowing into the low temperature shift unit 13 is set from 150° C. to 350° C. The temperature of the reformed gas flowing out of the low temperature shift unit 13 is set from 150° C. to 250° C. The temperature of the reformed gas flowing into the preferential oxidation unit 8 is set from 90° C. to 210° C. (from 120° C. to 190° C.).

The arrangement relation of the burner 10, the combustion tube 11, the exhaust gas flow path L1, the reforming unit 6, the high temperature shift unit 12, the low temperature shift unit 13, the preferential oxidation unit 8, and the vaporization unit 9 as described above will now be described in more details.

As illustrated in FIG. 2, the combustion tube 11 is provided at a lower end portion of the burner 10 so as to surround flame of the burner 10. The combustion tube 11 exhausts an exhaust gas, which is combustion gas of the burner 10, from the lower side thereof (one side). The reforming unit 6 is provided in a tubular shape (here, a cylindrical outer shape with the axis G as the center axis as described above) so as to surround the combustion tube 11. The exhaust gas flow path L1 is provided in a tubular shape so as to pass through between the combustion tube 11 and the reforming unit 6 from the lower side of the combustion tube 11, fold back at the upper side (the other side) of the reforming unit 6, extend through the outside of the reforming unit 6 to the lower side thereof. The high temperature shift unit 12 is provided in a tubular shape so as to surround the reforming unit 6 and to be surrounded with a portion L1a of the exhaust gas flow path L1 that passes through the outside of the reforming unit.

The low temperature shift unit 13 is provided in a tubular shape so as to be surrounded with a portion L1b (extending portion) of the exhaust gas flow path L1 that extends on the lower side. In other words, the low temperature shift unit 13 is provided in a tubular shape on the inside (here, the radially inner side) of the portion L1b of the exhaust gas flow path L1 so as to extend along the portion L1b. The vaporization unit 9 is provided in a tubular shape so as to surround the portion L1b of the exhaust gas flow path L1. The preferential oxidation unit 8 is provided in a tubular shape so as to surround the vaporization unit 9. In other words, the preferential oxidation unit 8 is provided in a tubular shape on the outside (here, the radially outer side) of the portion L1b of the exhaust gas flow path L1 so as to extend along the portion L1b.

An upper end portion (an end portion on the other side) of the low temperature shift unit 13 is located above an upper end portion of the preferential oxidation unit 8. An upper end portion of the vaporization unit 9 is located on the outside of a lower end portion (an end portion on one side) of the high temperature shift unit 12. Then, when a reformed gas is being generated in the reforming unit 6, the level WF of water stored in the vaporization unit 9 is regulated so as to be located above the upper end portion of the low temperature shift unit 13 and the upper end portion of the preferential oxidation unit 8.

The feed unit 5 extends from a position facing the combustion tube 11 on the lower side of the combustion tube 11 to the lower end portion of the reforming unit 6. A reformed gas flow path L2 for passing the reformed gas generated in the reforming unit 6 extends from the outside of the upper end portion of the reforming unit 6, passes through the high temperature shift unit 12 and the low temperature shift unit 13 from the upper side to the lower side, and passes through the preferential oxidation unit 8 from the lower side to the upper side to reach the cell stack 20.

A water flow path L3 for passing water introduced to the vaporization unit 9 passes through a preheating unit 15 provided at a portion of the reformed gas flow path L2 that is provided downstream of the preferential oxidation unit 8, and reaches the lower end portion of the vaporization unit 9. The preheating unit 15 preheats water to be introduced to the vaporization unit 9 with the heat of the reformed gas derived from the preferential oxidation unit 8. A steam flow path L4 for passing steam generated by the vaporization unit 9 joins a raw fuel flow path L5 for passing a raw fuel from the upper end portion of the vaporization unit 9 and reaches the feed unit 5.

As described above, in the hydrogen production apparatus 1 of the fuel cell system 100, the low temperature shift unit 13 is provided in a tubular shape inside of the portion L1b of the exhaust gas flow path L1 so as to extend along the portion L1b, and the preferential oxidation unit 8 is provided in a tubular shape on the outside of the portion L1b of the exhaust gas flow path L1 so as to extend along the portion L1b. Therefore, when the exhaust gas, which is combustion gas of the burner 10, is passed through the exhaust gas flow path L1 during start-up of the hydrogen production apparatus 1, the heat of the exhaust gas heats not only the reforming unit 6 and the high temperature shift unit 12 but also the low temperature shift unit 13, the preferential oxidation unit 8, and the vaporization unit 9 to increase the temperature thereof. In this manner, in the hydrogen production apparatus 1, the use of an electrical heater in the low temperature shift unit 13 and the preferential oxidation unit 8 becomes unnecessary during start-up and the temperature of the low temperature shift unit 13 and the preferential oxidation unit 8 can be quickly increased while suppressing consumption of start-up energy.

Furthermore, the vaporization unit 9 is provided in a tubular shape between the portion L1b of the exhaust gas flow path L1 and the preferential oxidation unit 8 so as to extend along the portion L1b. Accordingly, when water is introduced to the vaporization unit 9, and a raw fuel and steam are further introduced to the reforming unit 6 to allow the reforming unit 6 to generate a reformed gas, not only the heat of the exhaust gas but also the heat of the reaction in the low temperature shift unit 13 and the heat of the reaction in the preferential oxidation unit 8 move to the vaporization unit 9. Thus, the low temperature shift unit 13 and the preferential oxidation unit 8 can be kept at the respective proper reaction temperatures.

In the case where this vaporization unit 9 is provided, water is introduced to the vaporization unit 9 after the reforming unit 6, each of the shift units 12 and 13, and the preferential oxidation unit 8 are heated with the heat of the exhaust gas to some extent, whereby the reforming unit 6, each of the shift units 12 and 13, and the preferential oxidation unit 8 can be further heated with the heat of superheated vapor.

The upper end portion of the low temperature shift unit 13 is located above the upper end portion of the preferential oxidation unit 8. Thus, the upper end portion of the low temperature shift unit 13 is closer to flame of the burner 10 than the upper end portion of the preferential oxidation unit 8 and, in addition, is heated with the exhaust gas passing through the portion L1b of the exhaust gas flow path L1 on the further upstream side. Accordingly, the upper end portion of the low temperature shift unit 13 serving as an input port of the reformed gas to the low temperature shift catalyst 13x can be made hotter than the upper end portion of the preferential oxidation unit 8 serving as an output port of the reformed gas from the preferential oxidation catalyst 8x.

The preheating unit 15 preheats water introduced to the vaporization unit 9 with the heat of the reformed gas derived from the preferential oxidation unit 8. This can prevent bumping of the water introduced to the vaporization unit 9 and prevent the effects of vaporization vibration on the steam introduced to the reforming unit 6.

The upper end portion of the vaporization unit 9 is located on the outside of the lower end portion of the high temperature shift unit 12. Thus, the upper end portion of the vaporization unit 9 is heated, so that the amount of water vaporized in the vaporization unit 9 is increased. Thus, steam can be stably introduced to the reforming unit 6.

When the reformed gas is being generated in the reforming unit 6, the level WF of water stored in the vaporization unit 9 is regulated so as to be located above the upper end portion of the low temperature shift unit 13 and the upper end portion of the preferential oxidation unit 8. Accordingly, the heat of the reaction in the low temperature shift unit 13 and the heat of the reaction in the preferential oxidation unit 8 can be moved to the water in the vaporization unit 9 reliably, so that the low temperature shift unit 13 and the preferential oxidation unit 8 can be stably kept at the respective proper reaction temperatures.

Although an embodiment of the present invention has been described above, the present invention is not limited to the foregoing embodiment.

Figure 3:
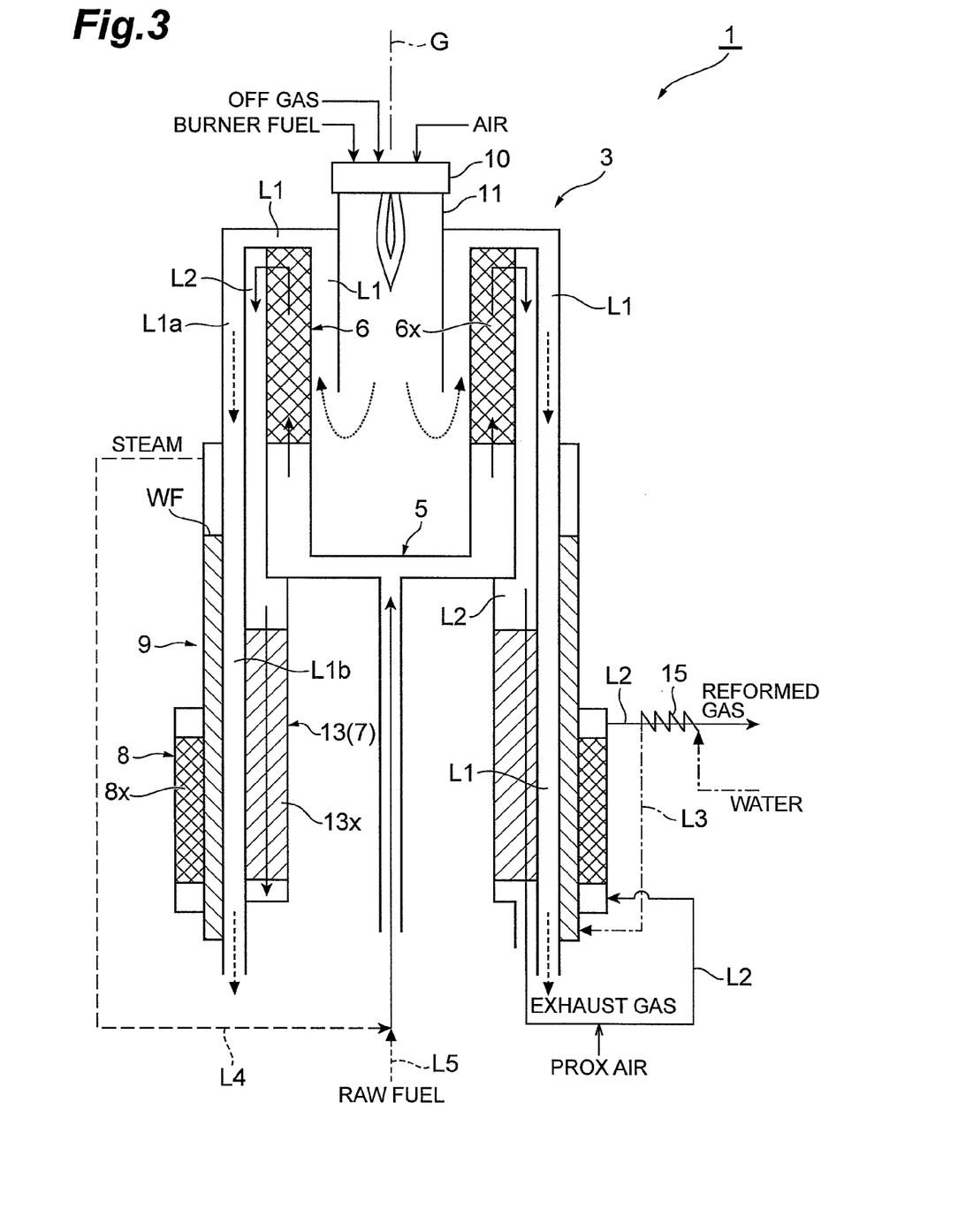
FIG. 3 is an end view of a hydrogen production apparatus according to another embodiment of the present invention.

For example, the hydrogen production apparatus is not limited to the one that includes the high temperature shift unit and the low temperature shift unit for a shift reaction of carbon monoxide in a reformed gas and may be the one that only includes the low temperature shift unit. As illustrated in FIG. 3, in the case where the shift reaction of the reformed gas is performed only in the low temperature shift unit 13, it is preferable that the upper end portion of the vaporization unit 9 be located on the outside of the lower end portion of the reforming unit 6. In this case, the upper end portion of the vaporization unit 9 is heated, so that the amount of water vaporized in the vaporization unit 9 is increased. Thus, steam can be stably introduced to the reforming unit 6.

Figure 4:
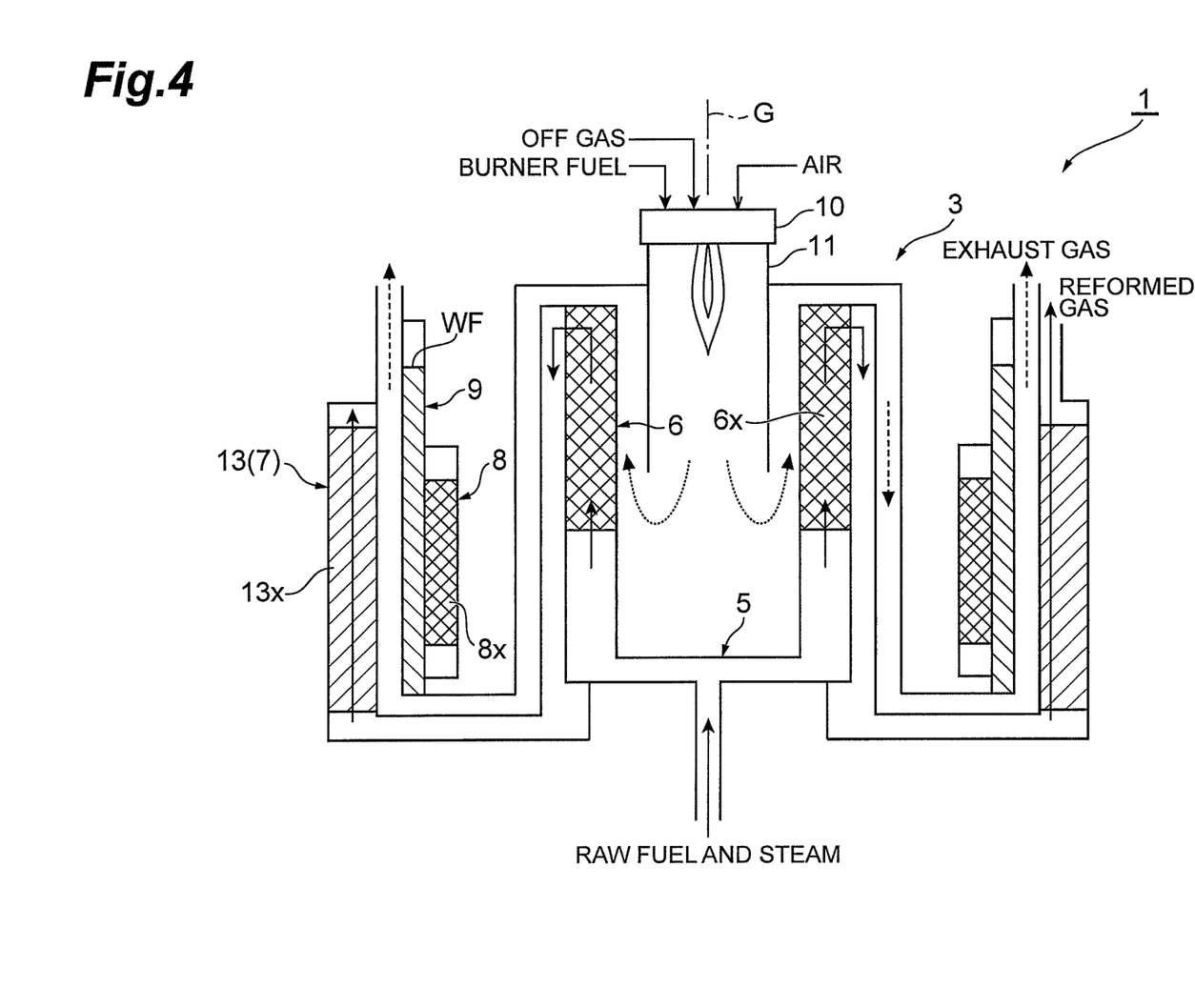
FIG. 4 is an end view of a hydrogen production apparatus according to yet another embodiment of the present invention.

The exhaust gas flow path is not limited to the one that passes through the outside of the reforming unit and then extends to the lower side. As illustrated in FIG. 4, the exhaust gas flow path L1 may pass through the outside of the reforming unit 6 and then fold back to extend to the upper side. In this case, the height of the hydrogen production apparatus 1 can be reduced, thereby reducing the size of the hydrogen production apparatus 1.

The low temperature shift unit may be provided in a tubular shape on the outside of the extending portion of the exhaust gas flow path so as to extend along the extending portion, and the preferential oxidation unit may be provided in a tubular shape inside of the extending portion of the exhaust gas flow path so as to extend along the extending portion.

The installation position of the vaporization unit is not limited to the one between the extending portion of the exhaust gas flow path and the preferential oxidation unit. The vaporization unit may be provided in a tubular shape so as to extend along the extending portion at at least one of the following positions: between the extending portion of the exhaust gas flow path and the low temperature shift unit; between the extending portion and the preferential oxidation unit; inside of the extending portion, the low temperature shift unit, and the preferential oxidation unit; and outside of the extending portion, the low temperature shift unit, and the preferential oxidation unit.

The reforming unit of the hydrogen production apparatus is not limited to the one that uses a steam reforming reaction and may be the one that uses any other reforming reaction as long as a reformed gas is generated using a raw fuel and steam. The hydrogen production apparatus may have such an arrangement in that the hydrogen production apparatus 1 described above is turned upside down (for example, a hydrogen production apparatus in which the burner 10 is installed at a lower portion thereof). The hydrogen production apparatus may include no desulfurization unit in some cases.

The "tubular shape" in the foregoing description includes not only an approximately cylindrical shape but also an approximately polygonal tubular shape. The approximately cylindrical shape and the approximately polygonal tubular shape mean a cylindrical shape and a polygonal tubular shape in a broader sense, including the ones generally equal to a cylindrical shape and a polygonal tubular shape and the ones at least including part of a cylindrical shape and a polygonal tubular shape. In the foregoing embodiment, a coaxial configuration having the axis G as the center axis is preferred. However, the present invention may be configured approximately coaxially or along the axis G.

INDUSTRIAL APPLICABILITY

According to the present invention, the temperature of the low temperature shift unit and the preferential oxidation unit can be quickly increased while suppressing consumption of start-up energy.

REFERENCE SIGNS LIST

1 . . . hydrogen production apparatus, 6 . . . reforming unit, 8 . . . preferential oxidation unit, 9 . . . vaporization unit, 10 . . . burner, 11 . . . combustion tube, 13 . . . low temperature shift unit, 20 . . . cell stack (fuel cell stack), 100 . . . fuel cell system, L1 . . . exhaust gas flow path, L1$b$ . . . portion (extending portion).

The invention claimed is:

1. A hydrogen production apparatus for generating a reformed gas containing hydrogen using a raw fuel and steam, the hydrogen production apparatus comprising:
    a burner;
    a combustion tube provided so as to surround flame of the burner and exhausting an exhaust gas of the burner from one side thereof;
    a reforming unit provided in a tubular shape so as to surround the combustion tube and subjecting the raw fuel and the steam to a reforming reaction to generate the reformed gas;
    an exhaust gas flow path provided in a tubular shape so as to pass through between the combustion tube and the reforming unit, fold back at the other side of the reforming unit, and extend through outside of the reforming unit on a predetermined side, the exhaust gas flow path passing the exhaust gas exhausted from the one side of the combustion tube;
    a low temperature shift unit provided in a tubular shape on one of inside and outside of an extending portion of the exhaust gas flow path that extends on the predetermined side so as to extend along the extending portion, the low temperature shift unit subjecting the reformed gas generated in the reforming unit to a shift reaction to reduce a carbon monoxide concentration in the reformed gas; and
    a preferential oxidation unit provided in a tubular shape on the other of the inside and the outside of the extending portion so as to extend along the extending portion, the preferential oxidation unit preferentially oxidizing the reformed gas subjected to the shift reaction in the low temperature shift unit to further reduce the carbon monoxide concentration.

2. The hydrogen production apparatus according to claim 1 further comprising a vaporization unit heating water stored therein with ambient heat to generate the steam, wherein
    the vaporization unit is provided in a tubular shape so as to extend along the extending portion at one or more of the following positions: between the extending portion and the low temperature shift unit; between the extending portion and the preferential oxidation unit; inside of the extending portion, the low temperature shift unit, and the preferential oxidation unit; and outside of the extending portion, the low temperature shift unit, and the preferential oxidation unit.

3. A fuel cell system comprising:
    the hydrogen production apparatus according to claim 1; and
    a fuel cell stack generating power using the reformed gas generated by the hydrogen production apparatus.

4. A fuel cell system comprising:
    hydrogen production apparatus according to claim 2; and
    a fuel cell stack generating power using the reformed gas generated by the hydrogen production apparatus.

5. The hydrogen production apparatus according to claim 1, further comprising a high temperature shift unit arranged adjacent to and radially outside the reforming unit so as to surround the reforming unit and provided in a tubular shape so as to be surrounded with a portion of the exhaust gas flow path that passes through the outside of the reforming unit, the high temperature shift unit subjecting carbon monoxide in the reformed gas supplied from the reforming unit to a high temperature shift reaction to reduce a carbon monoxide concentration in the reformed gas, wherein the low temperature shift unit is configured to subject the reformed gas subjected to the high temperature shift reaction in the high temperature shift unit to a low temperature shift reaction.

* * * * *